J. H. THORP.
Coal Oil Stove.

No. 103,526.

Patented May 24, 1870.

Witnesses:

Inventor:
J. H. Thorp
By Knight Bro
Attorney

UNITED STATES PATENT OFFICE.

JAMES H. THORP, OF NEW YORK, N. Y.

IMPROVEMENT IN COAL-OIL STOVES.

Specification forming part of Letters Patent No. 103,526, dated May 24, 1870.

*To all whom it may concern:*

Be it known that I, JAMES HENRY THORP, of the city, county, and State of New York, have invented an Improved Coal-Oil Stove, of which the following is a specification:

My improvements have reference to that description of stove which is heated by coal-oil lamp or lamps, and are designed, first, to preserve the wick-raiser and wick from the splashing of water which covers the top of the oil-reservoir; second, a deflector, of peculiar construction, to secure a more complete combustion of the carbon, thereby preventing smoke; third, a supplementary chimney to direct the caloric current more decidedly into the oven, or against the bottom of the vessel or the viands, as the case may be.

Figure 1:
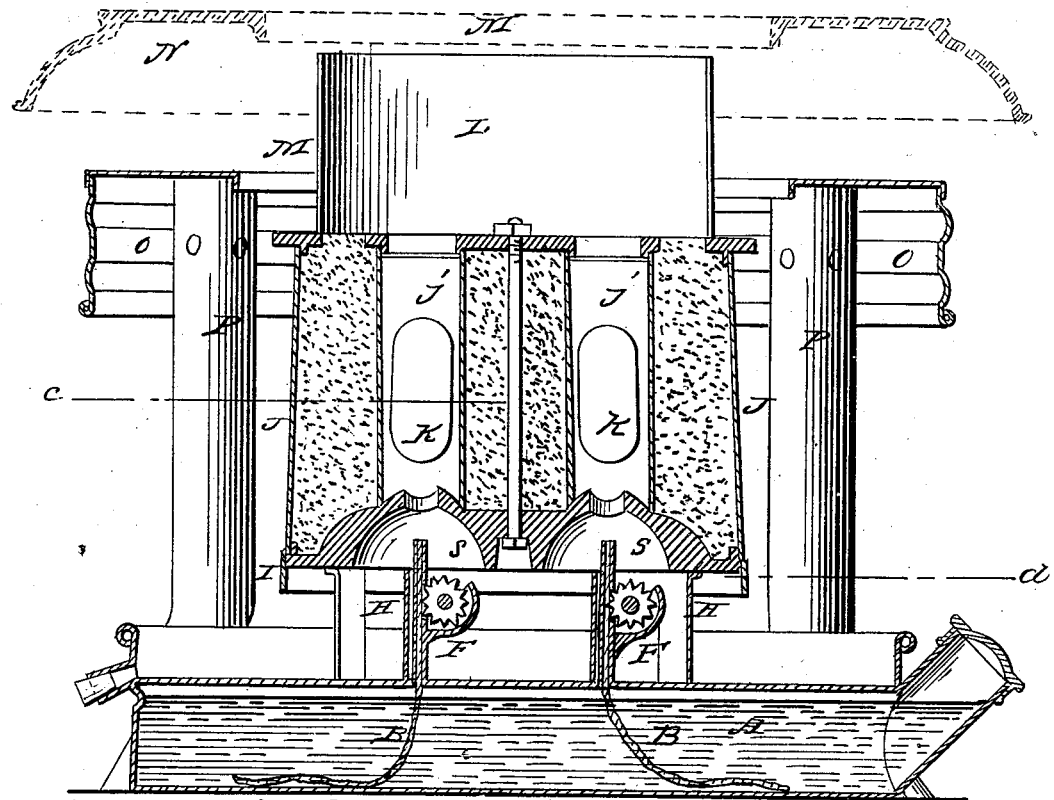
Figure 2:
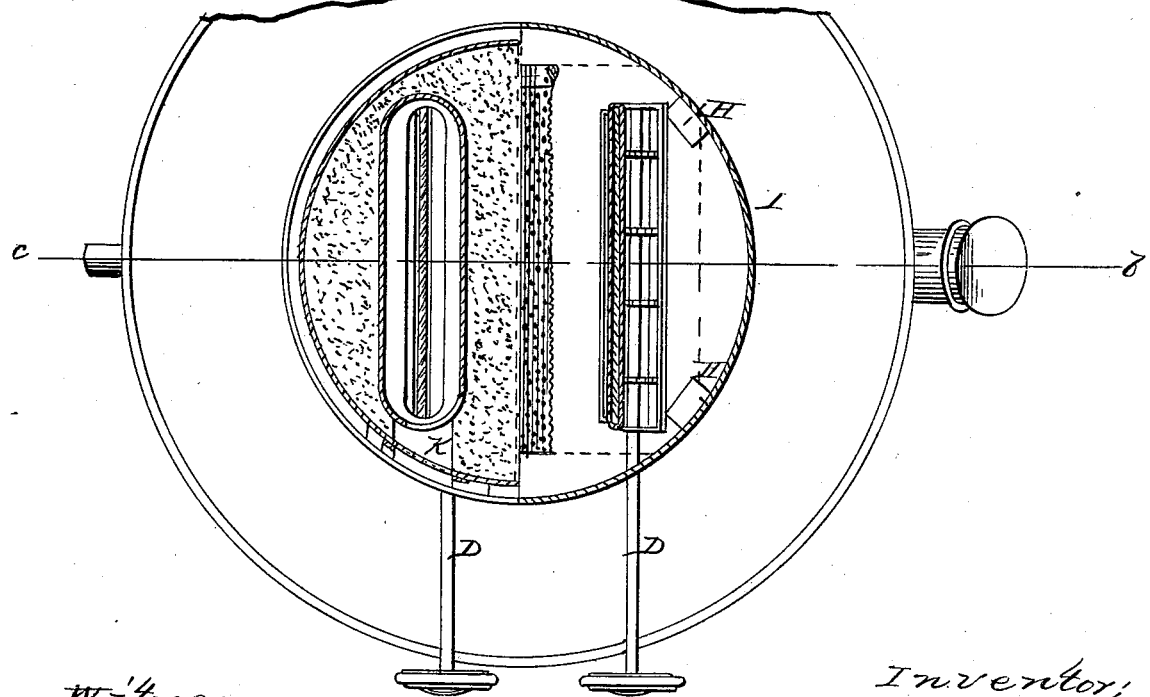

Figure 1 is a vertical section on the line $a\, b$, Fig. 2. Fig. 2 is a horizontal section on the line $c\, d$, Fig. 1.

A represents the reservoir of a coal-oil lamp, having two wicks, B B, elevated by the wick-raising wheels C C on the shafts D D.

Upon the top of the chamber A is a certain volume of water, perhaps a quarter of an inch deep. The object of this is twofold—to prevent the absorption of radiated heat by the plate forming the top of the chamber, and to extinguish any lighted matter which may fall into it, such as blazing grease, resulting from broiling of fat meat.

This feature of a water-trough on the lamp-top is not claimed herein as new, but the shield or guard-plate F, which is situated below and on one side of the wick-raising device, is claimed as a novel feature in this connection. Its office is to prevent the splashing of water against the wick or its operative device while moving the lamp or the stove.

H H are legs supporting a circular base-plate, I, upon which is erected a structure which may be called the chimney. For the sake of obtaining a sufficient amount of heat, I usually have two burners to each stove-hole, and this necessitates the use of a chimney for each. I have so represented the device, though I do not confine myself to any specific number. A single lamp may be used for a nurse-lamp, a shaving-lamp, or similar use.

The chimney J has openings $j\, j$ above each flame, and the openings are bounded by metallic plates. A mass of plaster-of-paris intervenes between the chimney-openings and the outer cylindrical shell, except at the points $k\, k$, which are mica-guarded openings, to allow the flame to be observed.

The base-plate of the chimney J is a plate, R, preferably of cast-iron, and having two openings, $s\, s$, of a peculiar form, the sides of which act as deflectors to the air which impinges upon the sides of the flame; and, it might be added, upon the ends of it also.

This opening $s\, s$ is of a somewhat semi-ellipsoidal form, and is best seen in the section, Fig. 1. The sides are curved, a form which I have found to be superior to a merely inclined surface, or a square-sided opening. The termination of each opening is shown with sides parallel to the general axis.

The upper plate of the chimney has openings above the flame, and also for the insertion of the plaster-of-paris, which constitutes a non-conducting jacket, and prevents the conduction of heat to the exterior cylinder, from whence it would be dissipated and lost. This would be undesirable for two reasons—on the score of economy, and in regard to heating other portions of the apparatus.

The apparatus is believed to be particularly well adapted for a summer stove. It is the intention to direct all the heat up the flues, and apply it to the utensils of the stove, or to the food, as the case may be. The heat being thus utilized upon its legitimate object, the lamp itself and its appurtenances are kept comparatively cool.

Upon the chimney J is erected a cylinder, L, which directs the caloric current to the stove-opening M, over which the kettle, gridiron, or oven, is placed. N is a part of the top stove-plate.

O represents a circular plate supported by legs, P P. This may be of such a height as to form a support for a kettle or other stove utensil, without the cylindrical extension L of the chimney, or, by having it of a suitable height, as shown by the stove-plate N, it may operate in connection with the said chimney L.

Having described my invention, what I claim therein as new, and desire to secure by Letters Patent, is—

1. The shield or guard-plate F, arranged and operating substantially as described and represented.

2. The plate R, with one or more openings, s s, having curved sides, substantially as represented, forming deflecting surfaces, whereby the air is caused to impinge upon the sides of the flame so as to maintain an approximately complete combustion.

3. The extension-chimney L, in combination with the chimney proper J j, for the more complete transmission of the caloric current to the objective point.

JAMES H. THORP.

Witnesses:
 JAS. MELDRUM,
 JAS. L. EWIN.